United States Patent
Peipelman et al.

(10) Patent No.: US 10,623,287 B2
(45) Date of Patent: Apr. 14, 2020

(54) INTELLIGENT GATHERING OF HISTORICAL PERFORMANCE INFORMATION

(71) Applicant: International Business Machines Corporation, Armonk, NY (US)

(72) Inventors: Jason L. Peipelman, Travis, TX (US); Yang Liu, Shanghai (CN); Eduardo Campos Peiro, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/010,463

(22) Filed: Jun. 17, 2018

(65) Prior Publication Data
US 2019/0386900 A1 Dec. 19, 2019

(51) Int. Cl.
*G06F 15/173* (2006.01)
*H04L 12/26* (2006.01)
*H04L 12/911* (2013.01)
*G06F 11/30* (2006.01)
*G06F 11/34* (2006.01)

(52) U.S. Cl.
CPC .......... *H04L 43/08* (2013.01); *G06F 11/3034* (2013.01); *G06F 11/3409* (2013.01); *H04L 47/82* (2013.01)

(58) Field of Classification Search
USPC .................................. 709/224, 223, 226, 229
See application file for complete search history.

(56) References Cited

U.S. PATENT DOCUMENTS

| | | | |
|---|---|---|---|
| 8,000,932 B2 | 8/2011 | Ding et al. |
| 8,055,686 B2 | 11/2011 | Ohata et al. |
| 8,171,545 B1 | 5/2012 | Cooley et al. |
| 8,504,522 B2 | 8/2013 | Wu et al. |
| 8,583,838 B1 | 11/2013 | Marshak et al. |
| 9,389,982 B2 | 7/2016 | Werner et al. |
| 9,542,459 B2 | 1/2017 | Crawford et al. |
| 2006/0265497 A1 | 11/2006 | Ohata et al. |

(Continued)

FOREIGN PATENT DOCUMENTS

WO WO9944112 A2 9/1999

OTHER PUBLICATIONS

List of IBM Patents or Patent Applications Treated as Related.
(Continued)

*Primary Examiner* — Lan Dai T Truong
(74) *Attorney, Agent, or Firm* — Nelson and Nelson; Daniel P. Nelson; Alexis V. Nelson

(57) ABSTRACT

A method for intelligently gathering historical performance information for computing resources is disclosed. In one embodiment, such a method includes determining a set of computing resources for which to gather performance information. The method further designates criteria that is used to divide the computing resources into subsets. For a first subset of computing resources, the method gathers performance information for the first subset at a first frequency. For a second subset of computing resources, the method gathers performance information for the second subset at a second frequency that differs from the first frequency. Computing resources may move between the first and second subsets based on whether they satisfy or do not satisfy the criteria. A corresponding system and computer program product are also disclosed.

20 Claims, 8 Drawing Sheets

(56) References Cited

U.S. PATENT DOCUMENTS

2009/0164705 A1   6/2009  Gorobets
2011/0099268 A1   4/2011  Ozaki et al.

OTHER PUBLICATIONS

Albazzaz et al., "Historical data analysis based on plots of independent and parallel coordinates and statistical control limits", Journal of Process Control, vol. 16, Issue 2, Feb. 2006, pp. 103-114.

INTELLIGENT GATHERING OF HISTORICAL PERFORMANCE INFORMATION

BACKGROUND

Field of the Invention

This invention relates to systems and methods for gathering historical performance information for computing systems such as storage systems.

Background of the Invention

An application's performance is typically not only affected by the design of the application itself, but by components that the application uses or to which it connects. These components may include, for example, servers, network devices, application components, and storage systems that are utilized by the application during the course of its operation. One of the most common performance bottlenecks for an application is the storage system to which it performs I/O. Within the storage system, there are many different resources that may affect the performance of the storage system, including storage drives, logical volumes, host adapter cards, device adapter cards, cache, processors, I/O ports, storage arrays or pools, and the like. Poor performance of any of these resources may cause the storage system to perform poorly.

For this reason, the performance of storage system resources may be monitored to ensure that the storage system is operating in an optimal manner and doing its part to deliver satisfactory application performance. In certain cases, this may be accomplished by gathering and storing performance information for storage system resources. Unfortunately, the number of resources in a storage system can be very large. For example, a storage system such as the IBM DS8000™ enterprise storage system may host up to 64K logical volumes on its storage drives. Monitoring and storing information related to the performance of each of these resources can require a significant amount of storage space, processing power, and time. In some cases, the large number of resources may limit the number of resources that can be monitored and/or limit the types or frequency of information that can be gathered from these resources.

In view of the foregoing, systems and methods are needed to provide effective monitoring of computing resources in storage or other computing systems. Ideally, such systems and methods will provide effective monitoring and data gathering even when the number of resources that need to be monitored is very large. Further needed are systems and methods to limit the amount of storage space and processing power needed to perform the monitoring and data gathering.

SUMMARY

The invention has been developed in response to the present state of the art and, in particular, in response to the problems and needs in the art that have not yet been fully solved by currently available systems and methods. Accordingly, embodiments of the invention have been developed to intelligently gather historical performance information for computing resources. The features and advantages of the invention will become more fully apparent from the following description and appended claims, or may be learned by practice of the invention as set forth hereinafter.

Consistent with the foregoing, a method for intelligently gathering historical performance information for computing resources is disclosed. In one embodiment, such a method includes determining a set of computing resources for which to gather performance information. The method further designates criteria that is used to divide the computing resources into subsets. For a first subset of computing resources, the method gathers performance information for the first subset at a first frequency. For a second subset of computing resources, the method gathers performance information for the second subset at a second frequency that differs from the first frequency. Computing resources may move between the first and second subsets based on whether they satisfy or do not satisfy the criteria. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
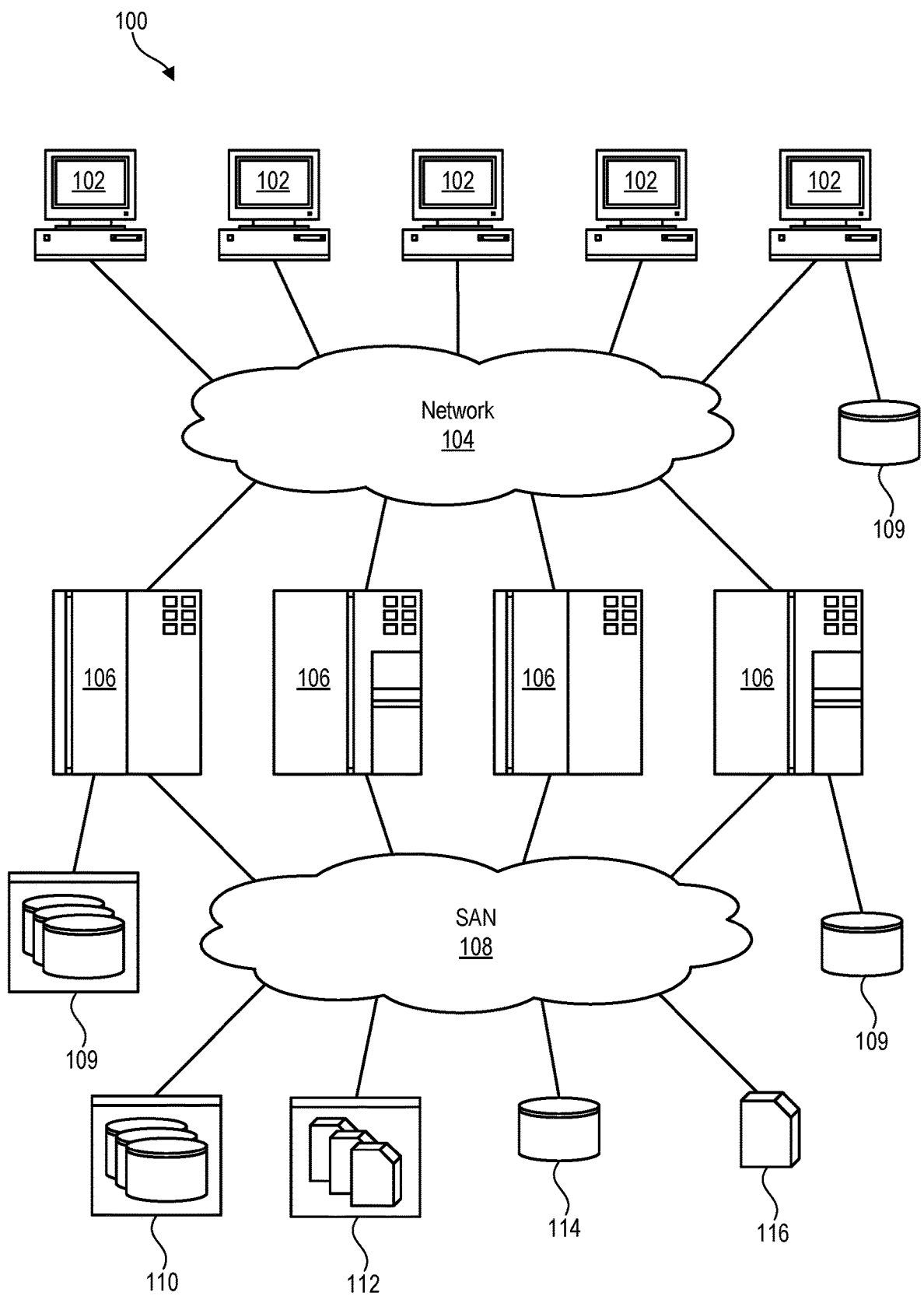
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays or individual hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
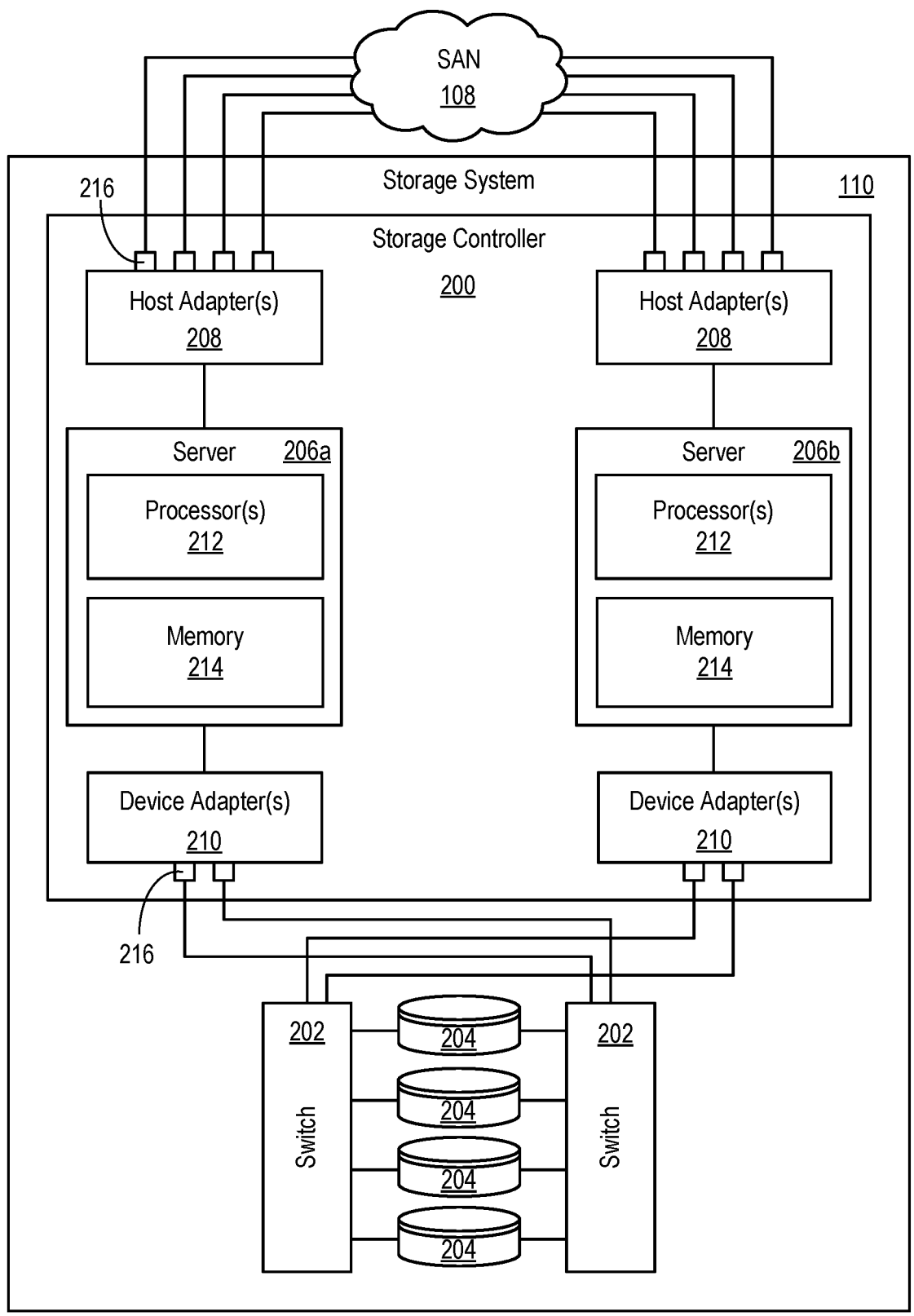
FIG. 2 is a high-level block diagram showing one example of a storage system, containing various computing resources, for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
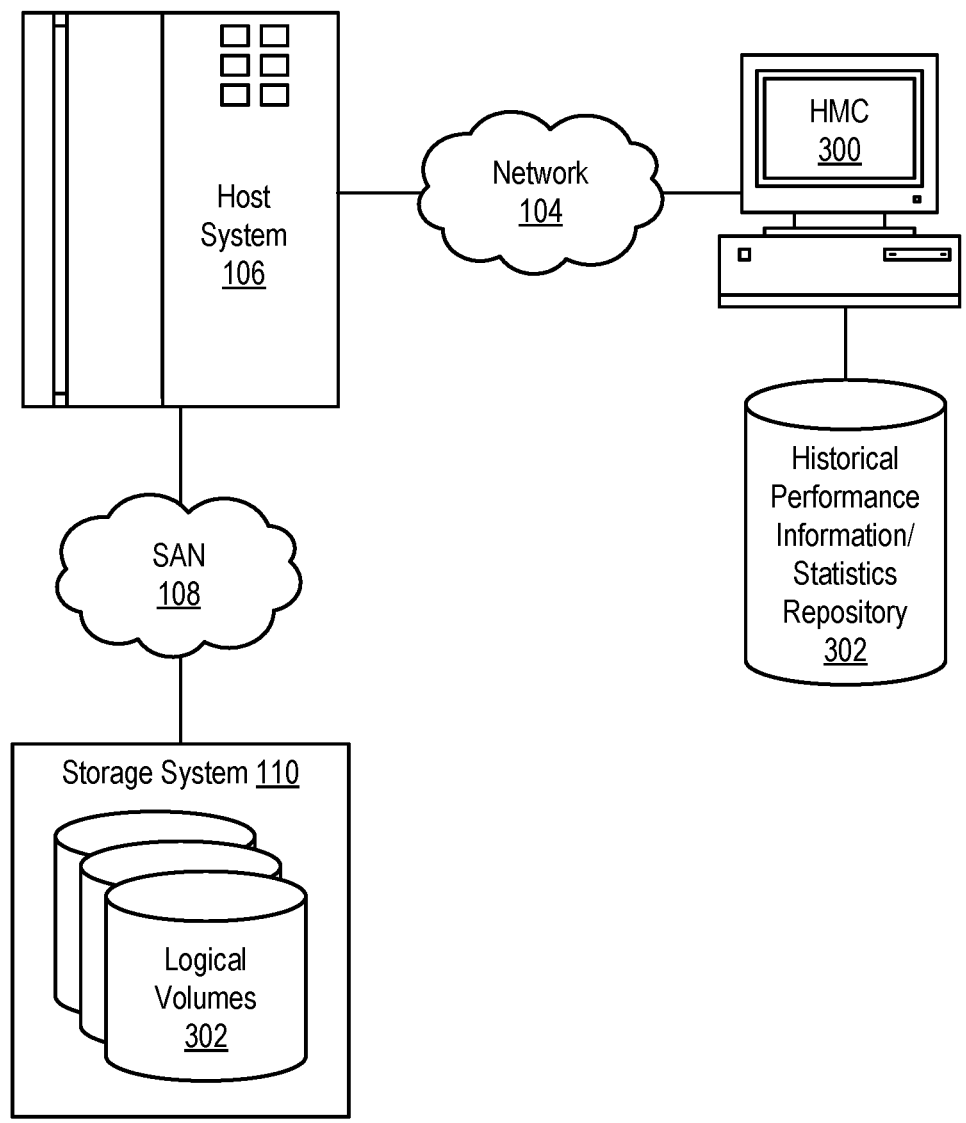
FIG. 3 is a high-level block diagram showing a hardware management console for gathering and storing performance information for computing resources of a storage system.

As previously mentioned, an application's performance is typically affected by components that the application uses or to which it connects. These components may include, for example, servers, network devices, application components, and storage systems that are utilized by the application during the course of its operation. One of the most common performance bottlenecks for an application is a storage system, such as the storage system 110 illustrated in FIG. 2. Within a storage system 110, there are many different computing resources that may affect the overall performance of the storage system 110, including the storage drives 204, logical volumes 302 (as shown in FIG. 3) carved out from the storage drives 204, host adapters 208, device adapters 210, cache 214 and memory 214 more generally, processors 212, I/O ports 216, storage arrays or pools created from the storage drives 204, and the like. Poor performance of any of these resources may cause the overall storage system 110 to perform poorly.

For this reason, the performance of storage system resources may be monitored to ensure that the storage system 110 is operating in an optimal manner and doing its part to deliver satisfactory application performance. In certain cases, this may be accomplished by gathering and storing historical performance information for resources within the storage system 110. Unfortunately, the number of resources in a storage system 110 such as that illustrated in FIG. 2 may be very large. For example, a storage system 110 such as the IBM DS8000™ enterprise storage system may host up to 64K logical volumes 302. Monitoring the performance of each of these logical volumes 302 in addition to other resources in the storage system 110 may require a significant amount of storage space, processing power, and time. In some cases, the large number of resources may limit the number of resources that can be monitored and/or limit the types or frequency of information that can be gathered from the resources.

Thus, systems and methods are needed to provide effective resource monitoring and data gathering in storage systems 110 or other computing systems. Ideally, such systems and methods can provide effective monitoring and data gathering even where the number of resources (also referred to herein as "computing resources") that need to be monitored in very large. Further needed are systems and methods to limit the amount of storage space and processing power that are needed to perform such monitoring and data gathering.

Referring to FIG. 3, in certain embodiments, a hardware management console 300 or other system 300 may be used to monitor resources of a storage system 110 or other computing system, such as a host system 106. In certain embodiments, the hardware management console 300 may be configured to store historical performance information associated with the resources in a repository 302. In certain embodiments, the repository 302 is implemented on local storage (e.g., a local disk drive or solid state drive) within the hardware management console 300. As previously mentioned, because the number of computing resources in a storage system 110 may be very large, the repository 302 may be limited in its ability to store historical performance info for the computing resources. Thus, in certain embodiments, the hardware management console 300 may be configured to more intelligently gather and store historical performance info to more efficiently utilize storage space in the repository 302.

Figure 4:
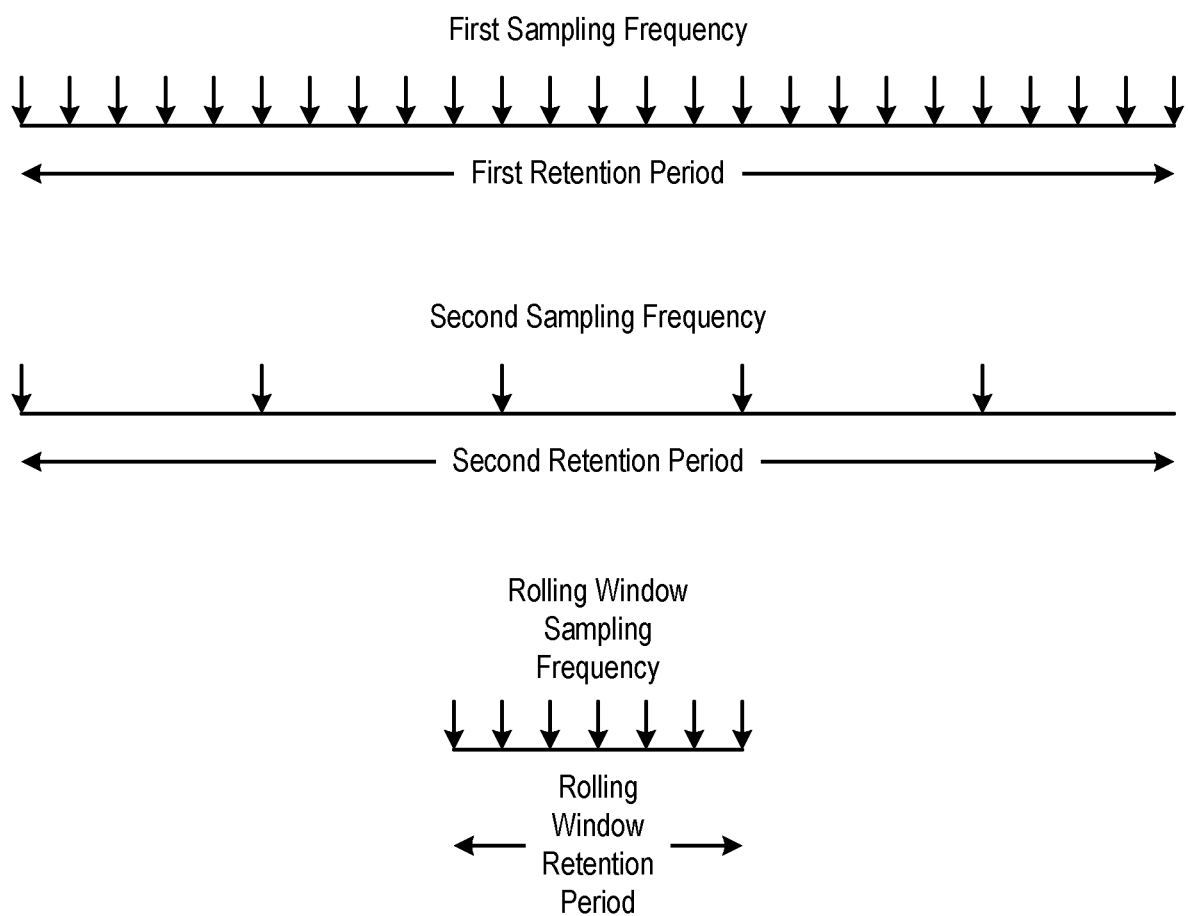
FIG. 4 is a high-level block diagram showing various sampling frequencies and retention periods for computing resources that are being monitored.

Referring to FIG. 4, while continuing to refer generally to FIG. 3, in certain embodiments in accordance with the invention, the hardware management console 300 may periodically sample performance information (e.g., latency, bandwidth, number of I/O operations, number of I/O operations per unit of time, etc.) from the computing resources and store this information in the repository 302. Because a computing system such as the storage system 110 may include many computing resources and the storage space in the repository 302 may be finite, the hardware management console 300 may prioritize which computing resources will have their information gathered, and the amount of information stored for each computing resource. In certain embodiments, this prioritization may be designated by a user, or the prioritization may be set or determined by algorithm as will be explained in more detail hereafter.

FIG. 4 shows an example of how sampling frequencies may be adjusted based on priority. As shown in FIG. 4, computing resources that are deemed of greater importance or priority may be queried for performance information at a first sampling frequency (e.g., every minute), while computing resources that are deemed of lesser importance or priority may be queried for performance information at a second sampling frequency (e.g., every five minutes). In certain embodiments, this performance information may be retained in the repository 302 in accordance with a designated retention policy. For example, performance information for computing resources of greater importance or priority may be may be maintained for a first retention period, while performance information for computing resources of lesser importance or priority may be may be maintained for a second retention period. In certain embodiments, the first and second retention periods are the same (e.g., one week) while in other embodiments the first and second retention periods are different. For example, the first retention period may be greater than the second retention period to reflect the greater importance attributed to the associated computing resources.

As further shown in FIG. 4, in certain embodiments, performance information of each computing resource may be sampled and stored over a short window (e.g., five minutes) at a relatively high frequency (e.g., every minute). This is referred to herein as a "rolling window" since sampled performance information is deleted after five minutes has transpired from the time it is sampled. In certain embodiments, this may occur for all computing resources regardless of their designated priority or importance. If an event, such as error, is detected in a computing resource, a snapshot of this rolling window may be taken and saved off to more persistent and longer term storage. This may assist in analyzing the computing resource during the window when the event occurred. The higher sampling frequency may provide more performance information with finer granularity to aid in the analysis. Because of the higher sampling frequency, the retention period may be kept short to reduce the amount of storage space that is consumed by data sampled during the rolling window.

Figure 5:
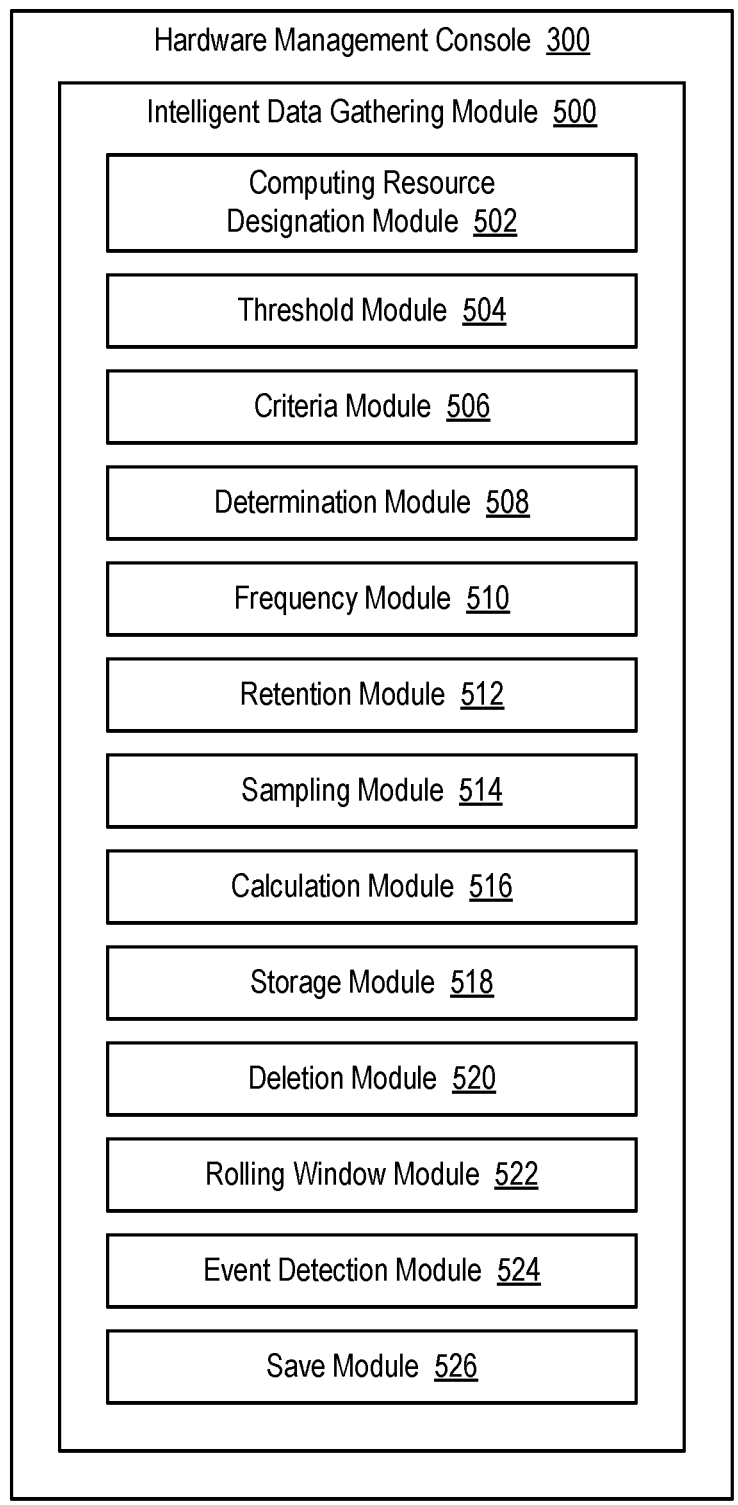
FIG. 5 is a high-level block diagram showing one embodiment of an intelligent data gathering module to provide various and functions in accordance with the invention.

Referring to FIG. 5, to provide the functionality described above in association with FIGS. 3 and 4, an intelligent data gathering module 500 maybe provided in the hardware management console 300. This intelligent data gathering module 500 may provide a more intelligent and efficient way to store performance information for computing resources, particularly large numbers of computing resources. The intelligent data gathering module 500 may be implemented in software, hardware, firmware, or a combination thereof and is not necessarily limited to implementation within a hardware management console 300.

As shown, the intelligent data gathering module 500 includes various sub-modules 502-526 to provide various features and functions. These sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the intelligent data gathering module 500 may include one or more of a computing resource designation module 502, threshold module 504, criteria module 506, determination module 508, frequency module 510, retention module 512, sampling module 514, calculation module 516, storage module 518, deletion module 520, rolling window module 522, event detection module 524, and save module 526.

The computing resource designation module 502 may be configured to designate which computing resources to monitor. In certain embodiments, a user may select the computing resources to monitor, or the computing resources may be selected by algorithm. In certain embodiments, the computing resource designation module 502 may designate all computing resources in a particular system, all computing resources of certain types (e.g., logical volumes 302, host adapters 208, device adapters 210, etc.), or individual computing resources.

The threshold module 504 may determine whether all computing resources can be monitored at full rate without overwhelming or exceeding the capacity of the repository 302. For example, if the number of computing resources is small enough, the repository 302 may be large enough to store performance information for the computing resources without reducing the amount of information stored. However, if the number of computing resources reaches a threshold, the threshold module 504 may determine that more intelligent monitoring and data storage is needed. This may trigger the intelligent data gathering module 500 to use a more efficient monitoring and storing technique, such as the technique discussed in association with FIG. 4. For example, more important computing resources may have performance information sampled at a higher frequency whereas less important computing resources may have performance information sampled at a lower frequency to reduce the amount of data stored in the repository 302.

The criteria module 506 may establish criteria for deciding whether a computing resource is sampled at the higher or lower rate (i.e., determines whether the computing resource belongs to a first subset that is sampled at a higher rate, or to a second subset that is sampled at a lower rate). For example, in certain embodiments, the top ten percent of computing resources in terms of I/O processing may be sampled at the higher rate whereas all other computing resources may be sampled at the lower rate. In another example, the most error-prone computing resources may be sampled at the higher rate whereas the least error-prone computing resources may be sampled at the lower rate. This will store more comprehensive performance information for more error-prone computing resources. Other criteria are possible and within the scope of the invention.

The determination module 508 may determine whether a computing resource meets the criteria established by the criteria module 506. Depending on whether a computing resource satisfies or does not satisfy the criteria, the frequency module 510 may determine a frequency with which to sample the computing resource, and the retention module 512 may determine the retention period to retain performance information associated with the computing resource. For example, performance information for more important computing resources may be sampled at a higher frequency and have a longer retention time whereas performance information for less important computing resources may be sampled at a lower frequency and have a shorter retention time.

Once the sampling frequency is determined for a computing resource, the sampling module 514 may sample performance information of the computing resource at the designated sampling frequency. In certain embodiments, the calculation module 516 may calculate different statistics (e.g., averages, rates, etc.) based on the sampled performance information. For example, if the sampling module 514 samples the number of I/Os processed by a computing resource at certain intervals, the calculation module 516 may calculate the I/Os per second (IOPS) by dividing the number of I/Os by the time between samples. Thus, in certain embodiments, the calculation module 516 may derive certain statistics or metrics from the performance information gathered by the sampling module 514.

Once desired performance information and/or statistics are gathered, the storage module 518 may store this information in the repository 302. This information may be retained in the repository 302 for the established retention period. Once the retention period has expired, the deletion module 520 may delete the information from the repository 302 to free up storage space and to accommodate future performance information and/or statistics.

The rolling window module 522 may be configured to implement the rolling window previously described in association with FIG. 4. As previously explained, performance information of computing resources may be sampled at a higher frequency during this rolling window, but deleted more rapidly than normal from the repository 302 to reduce utilization of storage space. Similarly, the event detection module 524 may be configured to detect an event, such as an error or condition, that a user may want to analyze more closely for a particular computing resource. The more frequent sampling may enable a user to take a closer look at conditions surrounding the event. When an event is detected, the save module 526 may take a snapshot of performance information contained in the rolling window and save it to more persistent and longer-term storage. The snapshot may include information gathered some time (e.g., five minutes) before the event as well as some time (e.g., five minutes) after the event.

Figure 6:
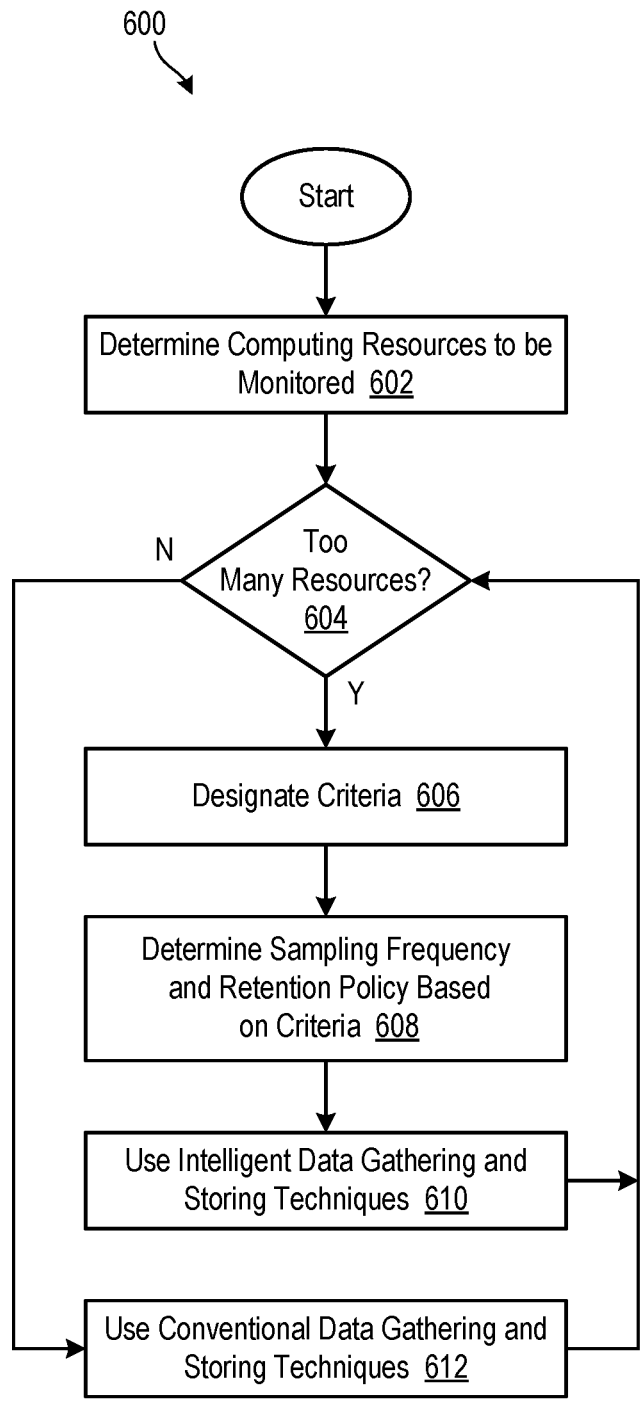
FIG. 6 is a process flow diagram showing a method for turning on intelligent data gathering in accordance with the invention.

Referring to FIG. 6, one embodiment of a method 600 for turning on intelligent data gathering in accordance with the invention is illustrated. As shown, the method 600 initially determines 602 what computing resources are to be monitored. The method 600 then determines 604 whether there are too many resources to be monitored at full rate without data reduction. If there are not too many resources, the method 600 uses 612 conventional data gathering and storing techniques to gather and store performance information for the computing resources.

If, on the other hand, there are too many resources, the method 600 designates 606 criteria for determining whether a computing resource is sampled at a higher or lower rate. The criteria may be used to divide the computing resources into different subsets of computing resources that are sampled differently. The method 600 determines 608 a sampling frequency and retention policy for computing resources in each of the subsets. Once the criteria, sampling frequency, and retention policy are determined, the method 600 uses 610 the intelligent data gathering and storing techniques to gather and store performance information for the computing resources.

Figure 7:
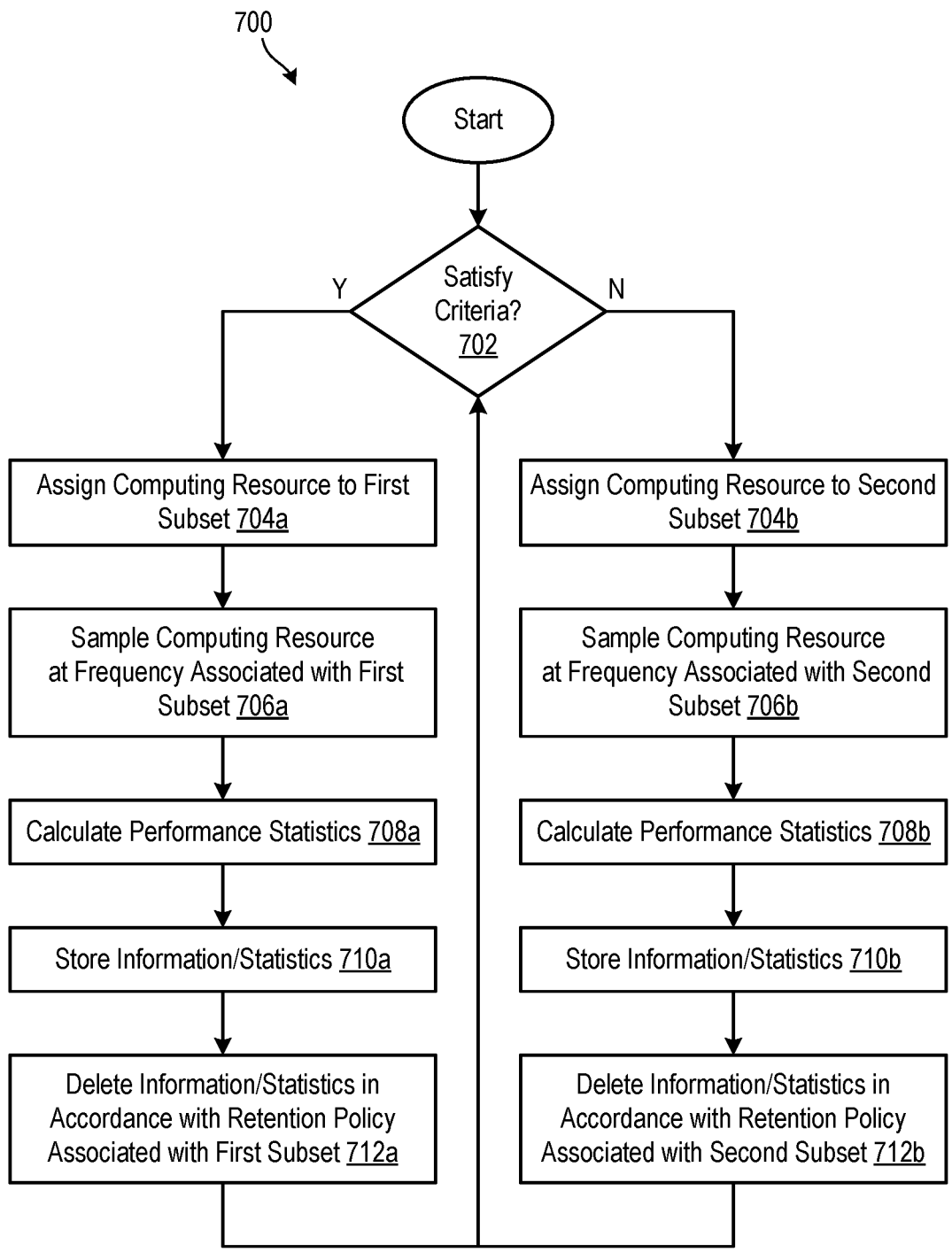
FIG. 7 is a process flow diagram showing a method for performing intelligent data gathering for two different subsets of computing resources.

Referring to FIG. 7, one embodiment of a method 700 for performing intelligent data gathering for two different subsets of computing resources is illustrated. More subsets are possible in other embodiments. As shown, once computing resources are selected for monitoring, the method 700 determines 702 whether each computing resource satisfies the criteria established 606 in the method 600 of FIG. 6. If a computing resource satisfies 702 the criteria, the method 700 assigns 704*a* the computing resource to a first subset. The method 700 then samples 706*a* the performance information of the computing resource at the frequency associated with the first subset. If needed, the method 700 calculates 708*a* statistics based on the performance information gathered at step 706*a*. The method 700 then stores 710*a* the information/statistics in the repository 302. The method 700 further deletes 712*a* the information/statistics from the repository 302 after a retention period associated with the second subset has expired.

If a computing resource does not satisfy 702 the criteria, the method 700 assigns 704*b* the computing resource to the second subset. The method 700 then samples 706*b* performance information of the computing resource at the frequency associated with the second subset. If needed, the method 700 calculates 708*b* statistics based on the performance information gathered at step 706*b*. The method 700 then stores 710*b* the information/statistics in the repository 302. The method 700 deletes 712*b* the information/statistics from the repository 302 after a retention period associated with the first subset has expired.

Figure 8:
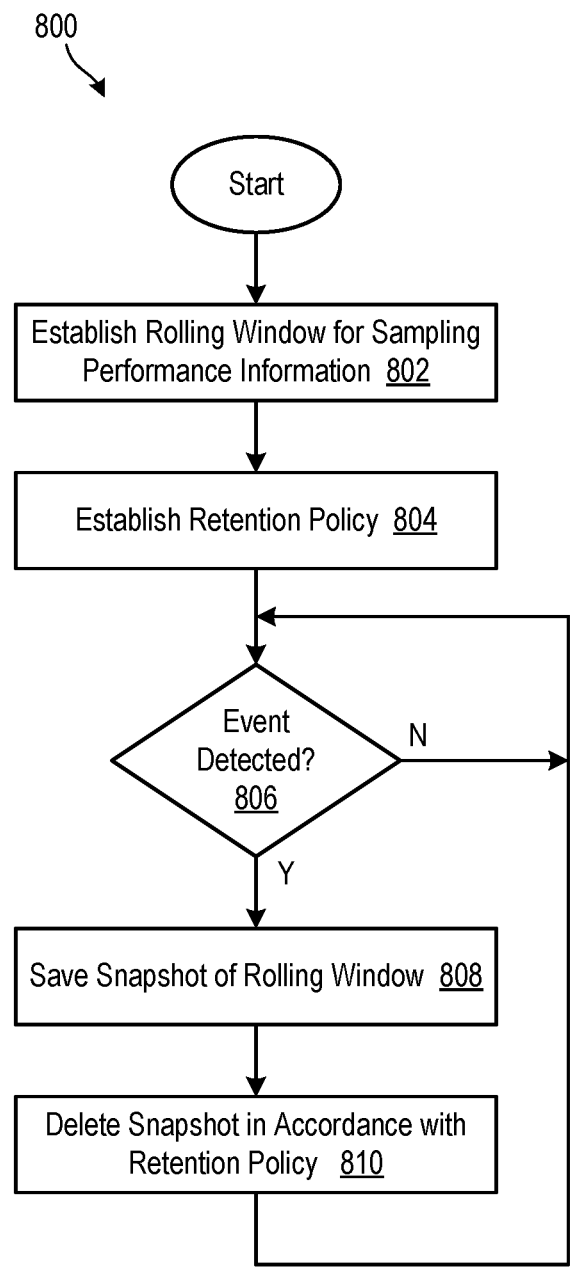
FIG. 8 is a process flow diagram showing a method for taking a snapshot of performance information in a rolling window when an event is detected in association with a computing resource.

Referring to FIG. 8, one embodiment of a method 800 is illustrated for saving windows of performance information when an event is detected. As shown, the method 800 establishes 802 a rolling window for sampling performance information from computing resources. The method 800 further establishes 804 a retention policy in association with the rolling window. When an event is detected 806, the method 800 takes 808 a snapshot of the performance information in the rolling window and saves 808 it to more persistent and longer-term storage. This snapshot is deleted 810 after the retention policy established at step 804 has expired.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for intelligently gathering historical performance information for computing resources, the method comprising:
   determining a set of computing resources for which to gather performance information;
   for a first subset of computing resources from the set that satisfy a criteria, gathering first performance information for the first subset at a first frequency; and
   for a second subset of computing resources from the set that do not satisfy the criteria, gathering second performance information for the second subset at a second frequency, wherein the second frequency is different from the first frequency.

2. The method of claim 1, further comprising moving computing resources between the first and second subsets based on whether the computing resources satisfy the criteria.

3. The method of claim 1, further comprising storing the first performance information for a first period of time prior to deletion.

4. The method of claim 3, further comprising storing the second performance information for a second period of time prior to deletion.

5. The method of claim 4, wherein the first period of time is different from the second period of time.

6. The method of claim 4, wherein the first period of time is the same as the second period of time.

7. The method of claim 1, wherein the computing resources include at least one of arrays of storage drives, individual storage drives, a storage system as a whole, storage pools, I/O ports, host adapters, device adapters, cache, and processor nodes.

8. A computer program product for intelligently gathering historical performance information for computing resources, the computer program product comprising a computer-readable storage medium having computer-usable program code embodied therein, the computer-usable program code configured to perform the following when executed by at least one processor:
   determine a set of computing resources for which to gather performance information;
   for a first subset of computing resources from the set that satisfy a criteria, gather first performance information for the first subset at a first frequency; and
   for a second subset of computing resources from the set that do not satisfy the criteria, gather second performance information for the second subset at a second frequency, wherein the second frequency is different from the first frequency.

9. The computer program product of claim 8, wherein the computer-usable program code is further configured to move computing resources between the first and second subsets based on whether the computing resources satisfy the criteria.

10. The computer program product of claim 8, wherein the computer-usable program code is further configured to store the first performance information for a first period of time prior to deletion.

11. The computer program product of claim 10, wherein the computer-usable program code is further configured to store the second performance information for a second period of time prior to deletion.

12. The computer program product of claim 11, wherein the first period of time is different from the second period of time.

13. The computer program product of claim 11, wherein the first period of time is the same as the second period of time.

14. The computer program product of claim 8, wherein the computing resources include at least one of arrays of storage drives, individual storage drives, a storage system as a whole, storage pools, I/O ports, host adapters, device adapters, cache, and processor nodes.

15. A system for intelligently gathering historical performance information for computing resources, the system comprising:
   at least one processor;
   at least one memory device operably coupled to the at least one processor and storing instructions for execution on the at least one processor, the instructions causing the at least one processor to:
      determine a set of computing resources for which to gather performance information;
      for a first subset of computing resources from the set that satisfy a criteria, gather first performance information for the first subset at a first frequency; and
      for a second subset of computing resources from the set that do not satisfy the criteria, gather second performance information for the second subset at a second frequency, wherein the second frequency is different from the first frequency.

16. The system of claim 15, wherein the instructions further cause the at least one processor to move computing resources between the first and second subsets based on whether the computing resources satisfy the criteria.

17. The system of claim 15, wherein the instructions further cause the at least one processor to store the first performance information for a first period of time prior to deletion.

18. The system of claim 17, wherein the instructions further cause the at least one processor to store the second performance information for a second period of time prior to deletion.

19. The system of claim 18, wherein the first period of time is different from the second period of time.

20. The system of claim 18, wherein the first period of time is the same as the second period of time.

* * * * *